(12) United States Patent
Lo

(10) Patent No.: US 7,740,495 B1
(45) Date of Patent: Jun. 22, 2010

(54) PORTABLE STORAGE DEVICE

(76) Inventor: Yu-Nan Lo, No.8, Lane 45, Ciancun E. Rd., Daya Township, Taichung County 42852 (TW)

( * ) Notice: Subject to any disclaimer, the term of this patent is extended or adjusted under 35 U.S.C. 154(b) by 0 days.

(21) Appl. No.: 12/501,384

(22) Filed: Jul. 10, 2009

(51) Int. Cl.
    *H01R 13/44* (2006.01)
(52) U.S. Cl. .................................... 439/142
(58) Field of Classification Search ........... 439/142, 439/136; 361/725–727
    See application file for complete search history.

(56) References Cited

U.S. PATENT DOCUMENTS

| | | | |
|---|---|---|---|
| 6,926,544 B2 * | 8/2005 | Lee | 439/147 |
| 6,932,629 B2 * | 8/2005 | Ikenoue | 439/138 |
| D519,503 S * | 4/2006 | Aqqad et al. | D14/480.5 |
| 7,295,431 B2 * | 11/2007 | Chuang | 361/679.55 |
| 7,473,112 B2 * | 1/2009 | Zhu et al. | 439/142 |
| 7,500,858 B2 * | 3/2009 | Emerson et al. | 439/136 |
| 7,530,823 B1 * | 5/2009 | Thornton et al. | 439/136 |
| 2004/0179342 A1 * | 9/2004 | Pritchard et al. | 361/715 |
| 2005/0130469 A1 * | 6/2005 | Ikenoue | 439/131 |
| 2006/0002069 A1 * | 1/2006 | Chuang | 361/683 |
| 2006/0131431 A1 * | 6/2006 | Finn | 235/492 |
| 2008/0019090 A1 * | 1/2008 | Zhu et al. | 361/684 |
| 2008/0026614 A1 * | 1/2008 | Emerson et al. | 439/136 |
| 2008/0192149 A1 * | 8/2008 | Lee | 348/725 |
| 2008/0276099 A1 * | 11/2008 | Nguyen et al. | 713/186 |

* cited by examiner

*Primary Examiner*—T C Patel
*Assistant Examiner*—Vladimir Imas
(74) *Attorney, Agent, or Firm*—Banger Shia

(57) ABSTRACT

A portable storage device essentially comprises a body and a protecting cap. The portable storage device is convenient to use since the portable storage device can be opened or closed easily by a pushing action.

1 Claim, 9 Drawing Sheets

PORTABLE STORAGE DEVICE

BACKGROUND OF THE INVENTION

1. Field of the Invention

The present invention relates to a storage device, and more particularly to a portable storage device.

2. Description of the Prior Art

Common travelling disks (namely, portable storage devices) are all equipped with a protecting cap to protect a plug on a disk body. When the travelling disc is in use, the protecting cap will be removed first, and then the plug will be inserted into a socket of a computer for accessing the data in the travelling disk. However, as for such a two-piece structure design, the protecting cap is prone to being lost due to carelessness of the user, thus causing much inconvenience. In order to avoid losing the protecting cap, many travelling disks with an inseparable protecting cap were developed on the market, such as Taiwan Patent No. M254698 entitled "travelling disk structure improvement", Taiwan Patent No. M269508 entitled "travelling disk with a slide type plug protecting cap", and so on. Nevertheless, the above travelling disks still suffer from many defects.

No matter how different the structure is, the operation of the travelling disk must include steps of pulling the protecting cap outward along the disk body first to disengage from the plug of the disk body, and then rotating the protecting cap 180 degrees to align the protecting cap to the rear end of the disk body, and subsequently pushing the protecting cap inwards along the disk body to locate it at the rear end of the disk body to shorten the overall length of the travelling disk in use for avoiding damage to the travelling disk due to impact. Hence, the operating method for all the conventional travelling disks must include steps of pulling outward, rotating and pushing inwards, thus causing much inconvenience in use due to too many actions.

The present invention has arisen to mitigate and/or obviate the afore-described disadvantages.

SUMMARY OF THE INVENTION

The primary objective of the present invention is to provide a portable storage device which is convenient to use since the portable storage device of the present invention can be opened or closed easily by a pushing action.

Hence, in order to achieve the above objective, a portable storage device in accordance with the present invention comprises a body and a protecting cap. The body includes a plug at a front end thereof, a front surface, a lower surface and two side surfaces connected between the upper and the lower surfaces, the upper surface and the lower surface each includes a pivot hole, and two positioning grooves around the pivot hole. The protecting cap includes two arms, and a covering portion connected to one end of the respective arms, the two arms each are provided on an inner side surface thereof with a protruding portion and two positioning portions around the protruding portion, the two arms are located on the upper and the lower surface of the body respectively, and the protruding portions of the two arms are pivoted into the pivot holes of the upper surface and the lower surface respectively, and the two positioning portions are capable of engaging with and disengaging from the respective positioning grooves. When the positioning portions are engaged into the positioning grooves, the covering portion will cover the plug at the front end of the body or a rear end of the body, and when the positioning portions are disengaged from the positioning grooves, the covering portion will not cover the plug any more.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
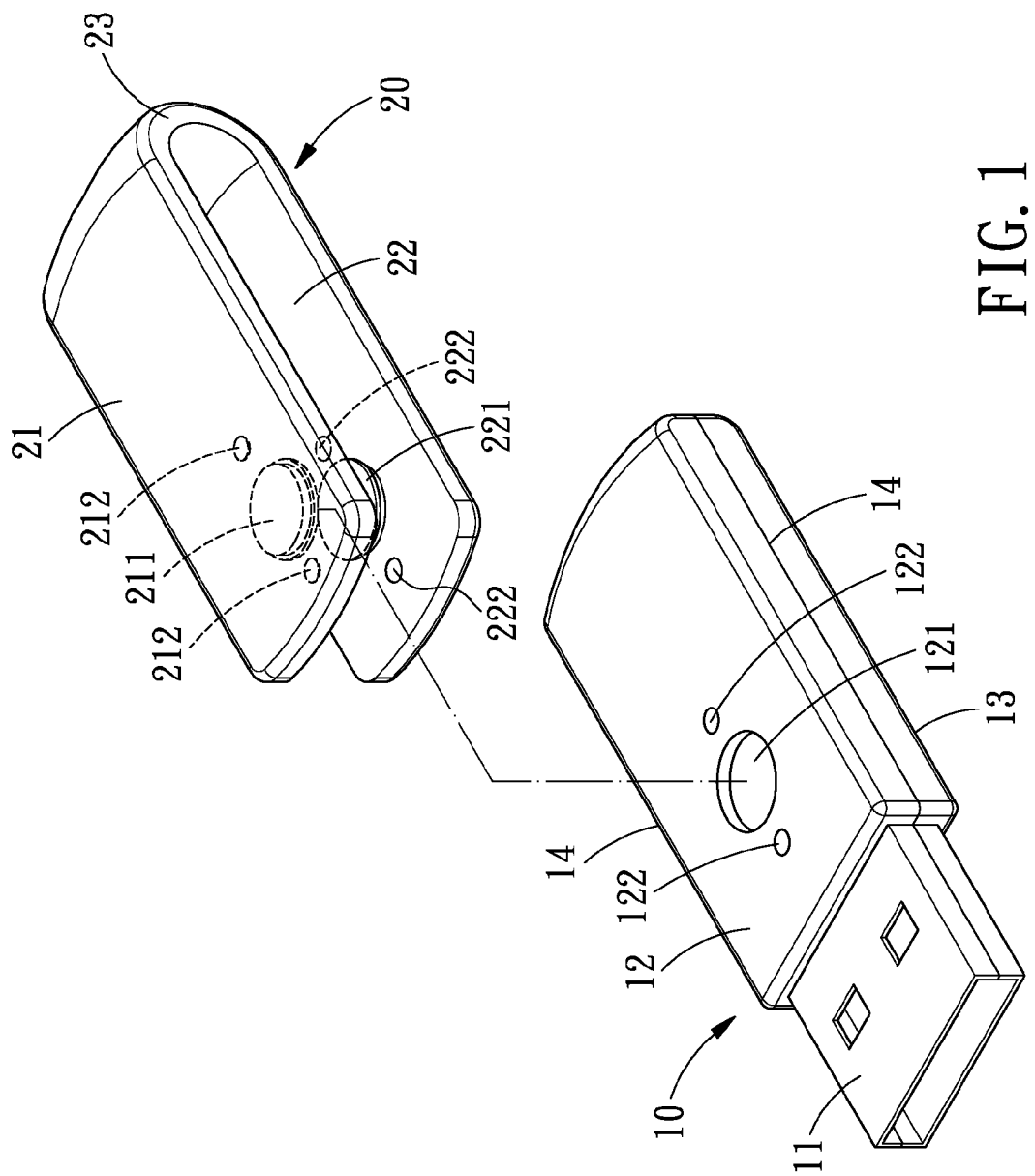
FIG. 1 is a perspective exploded view of a portable storage device in accordance with a first embodiment of the present invention.
Figure 2:
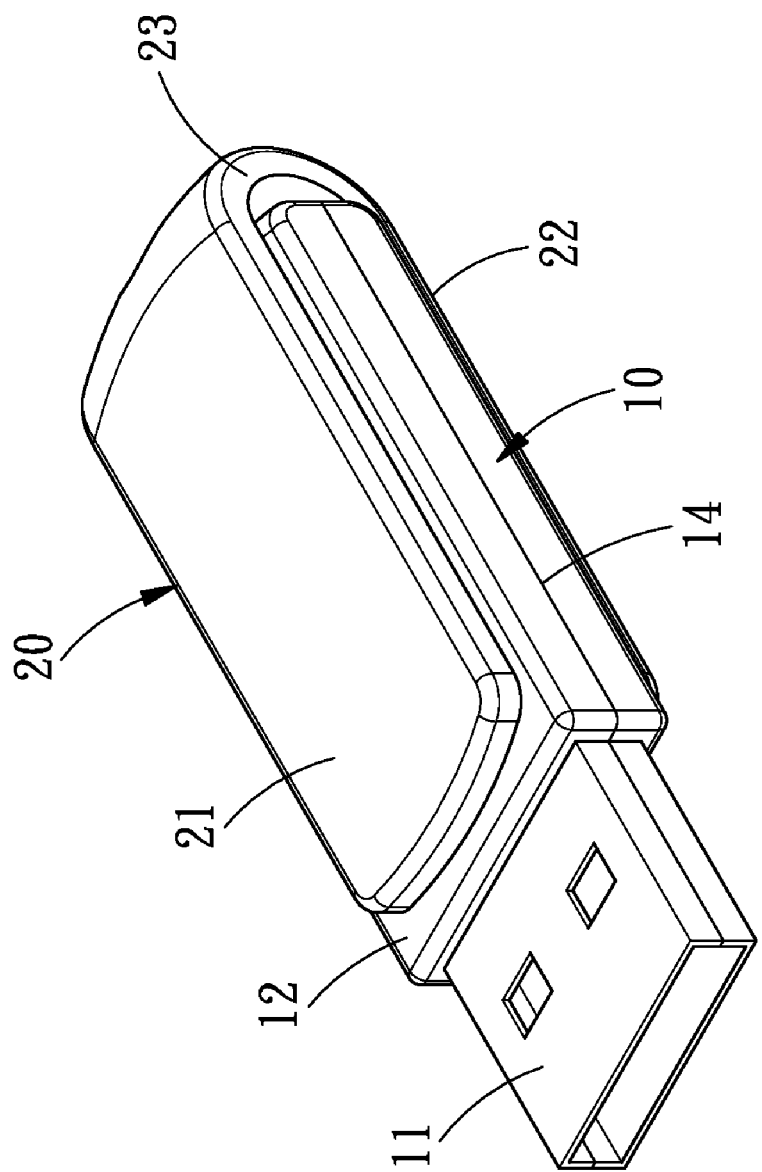
FIG. 2 is a perspective assembly view of the portable storage device in accordance with the first embodiment of the present invention.
Figure 3:
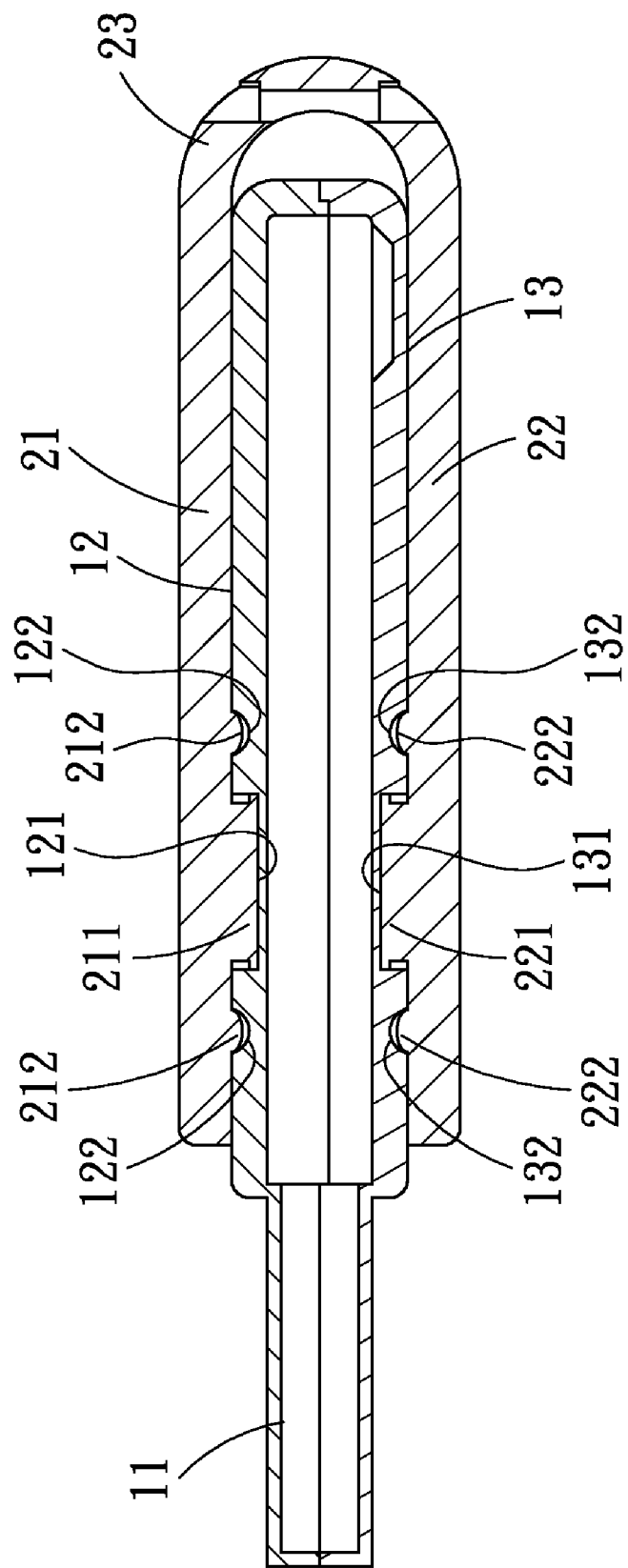
FIG. 3 is a cross sectional view of the portable storage device in accordance with the first embodiment of the present invention.

Referring to FIGS. 1-3 first, a portable storage device in accordance with a preferred embodiment of the present invention essentially comprises a body 10 and a protecting cap 20.

The body 10 is rectangular in cross section and includes a front end and a rear end. The body 10 includes a plug 11 at the front end thereof. The body 10 further includes an upper surface 12, a lower surface 13 and two side surfaces 14 connected between the upper surface 12 and the lower surface 13. The upper surface 12 and the lower surface 13 each includes a pivot hole 121, 131 which is round in cross section and two positioning grooves 122, 132 around the pivot hole 121, 131. The pivot holes 121, 131 are deeper than the respective positioning grooves 122, 132.

The protecting cap 20 is U-shaped in cross section and includes an upper arm 21, a lower arm 22 and a covering portion 23 connected to one end of each of the upper arm 21 and the lower arm 22. The upper arm 21 and the lower arm 22 are arranged parallel to each other and separated by a distance. Each of the upper arm 21 and the lower arm 22 includes a protruding portion 211, 221 which is round in cross section on an inner side surface thereof, and two positioning portions 212, 222 around the protruding portion 211, 221. The protruding portions 211, 221 are higher than the respective positioning portions 212, 222. The upper arm 21 and the lower arm 22 are located on the upper surface 12 and the lower surface 13, respectively. The protruding portions 211, 221 are pivoted into the pivot holes 121, 131 of the upper surface 12 and the lower surface 13, respectively. The two positioning portions 212, 222 are capable of engaging with or disengaging from the positioning grooves 122, 132. When the positioning portions 212, 222 are engaged into the positioning grooves 122, 132, the covering portion 23 covers the plug 11 at the front end of the body 10 or the rear end of the body 10. When the positioning portions 212, 222 are disengaged from the positioning grooves 122, 132, the covering portion 23 will not cover the plug 11 anymore.

The aforementioned is the summary of the positional and structural relationship of the respective components of the preferred embodiment in accordance with the present invention.

For a better understanding of the present invention, its operation and function, reference should be made to the following description.

Figure 6:
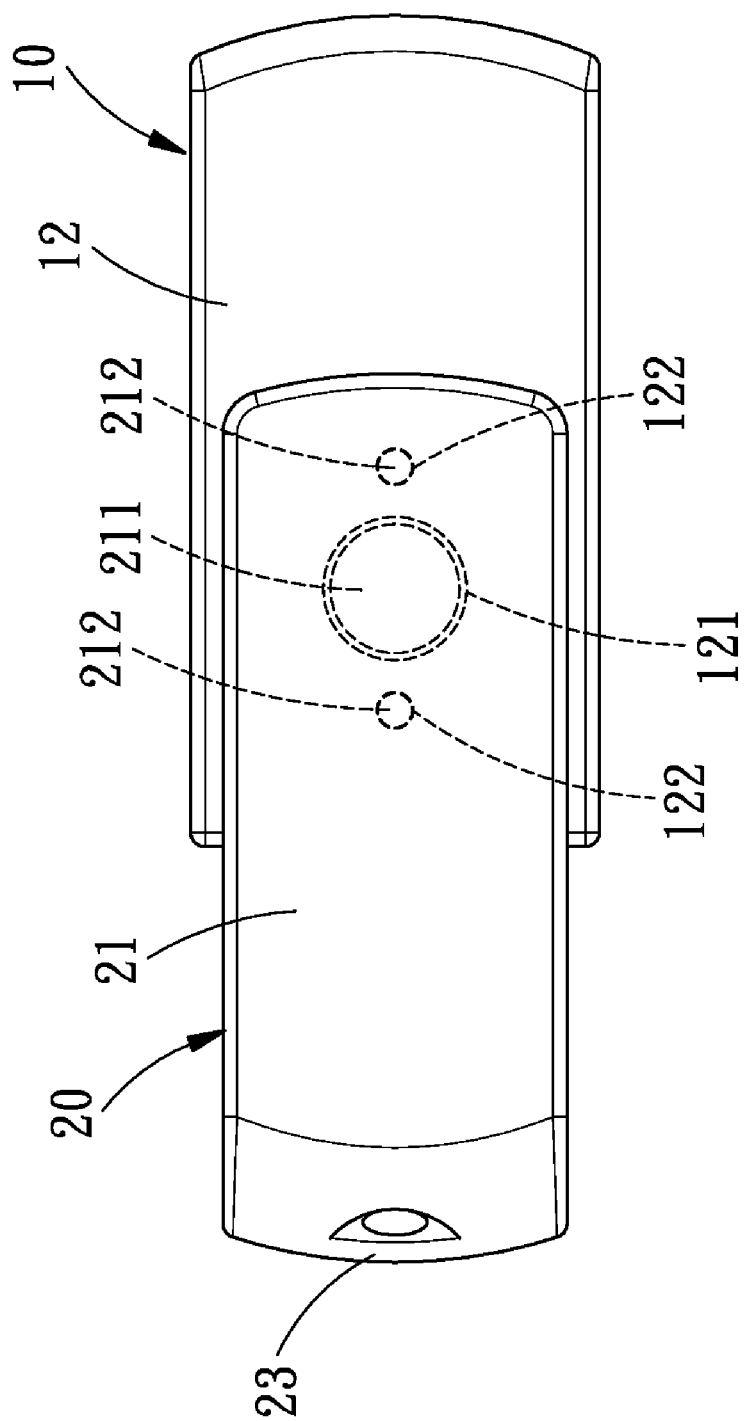
FIG. 6 is a top view showing an unused state of the portable storage device in accordance with the first embodiment of the present invention.
Figure 7:
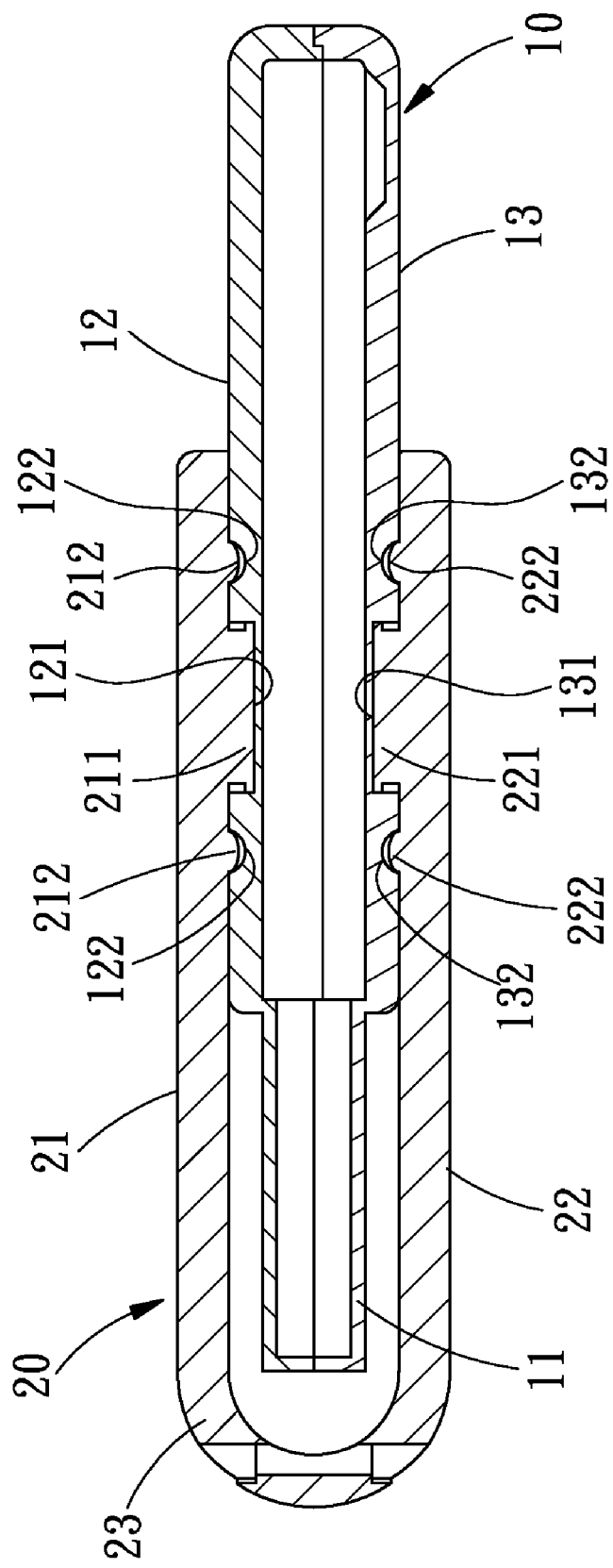
FIG. 7 is a cross sectional view showing the unused state of the portable storage device in accordance with the first embodiment of the present invention.

Referring to FIGS. 6 and 7 showing that the portable storage device in accordance with the present invention is in an unused state, the positioning portions 212, 222 of the upper and the lower arms 21, 22 of the protecting cap 20 are engaged in the positioning grooves 122, 132 of the upper and the lower surfaces 12, 13 of the body 10, so that the covering portion 23 of the protecting cap 20 covers the plug 11 at the front end of the body 10 to prevent the plug 11 from being damaged due to impact.

Figure 5:
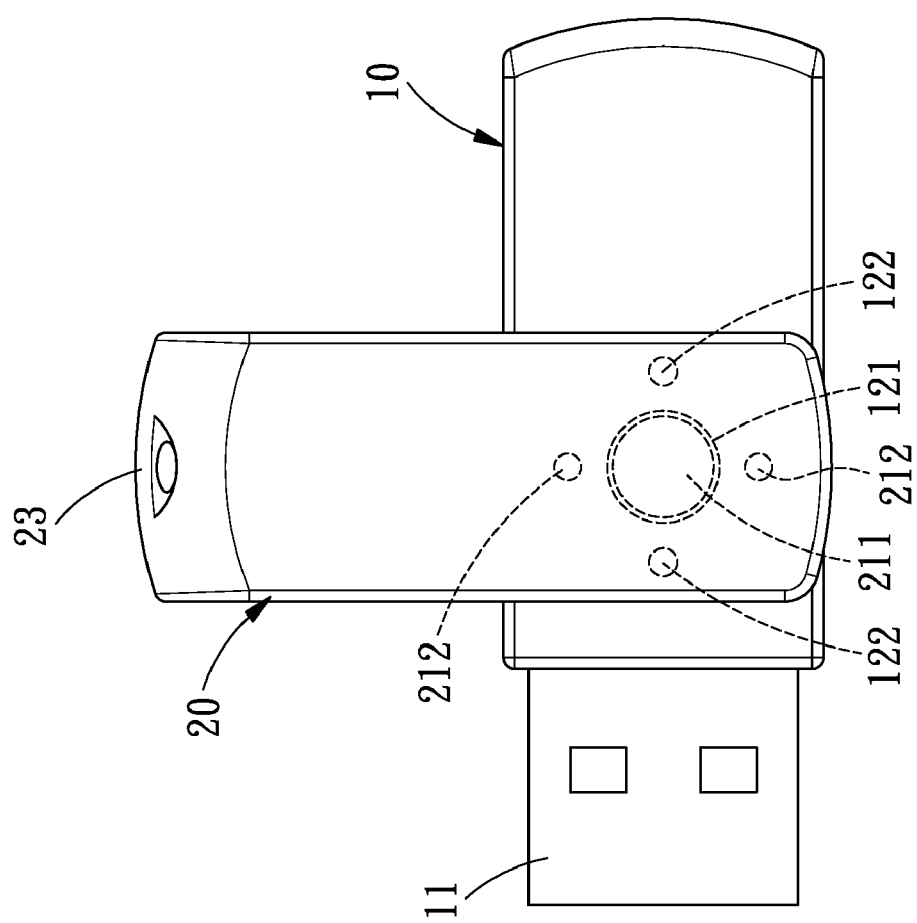
FIG. 5 is a top view showing that the protecting cap of the portable storage device in accordance with the first embodiment of the present invention is rotated.

Referring to FIG. 5 showing that the protecting cap 20 is rotated when the portable storage device of the present invention is in use, based on the body 10, the protecting cap 20 is pushed toward one side of the body 10, at this moment, the protecting cap 20 is rotated an angle about the protruding portions 211, 221, at the same time, the positioning portions 212, 222 of the protecting cap 20 are disengaged from the positioning grooves 122, 132 of the body 10, and the covering portion 23 of the protecting cap 20 will not cover the plug 11 of the body 10.

Figure 4:
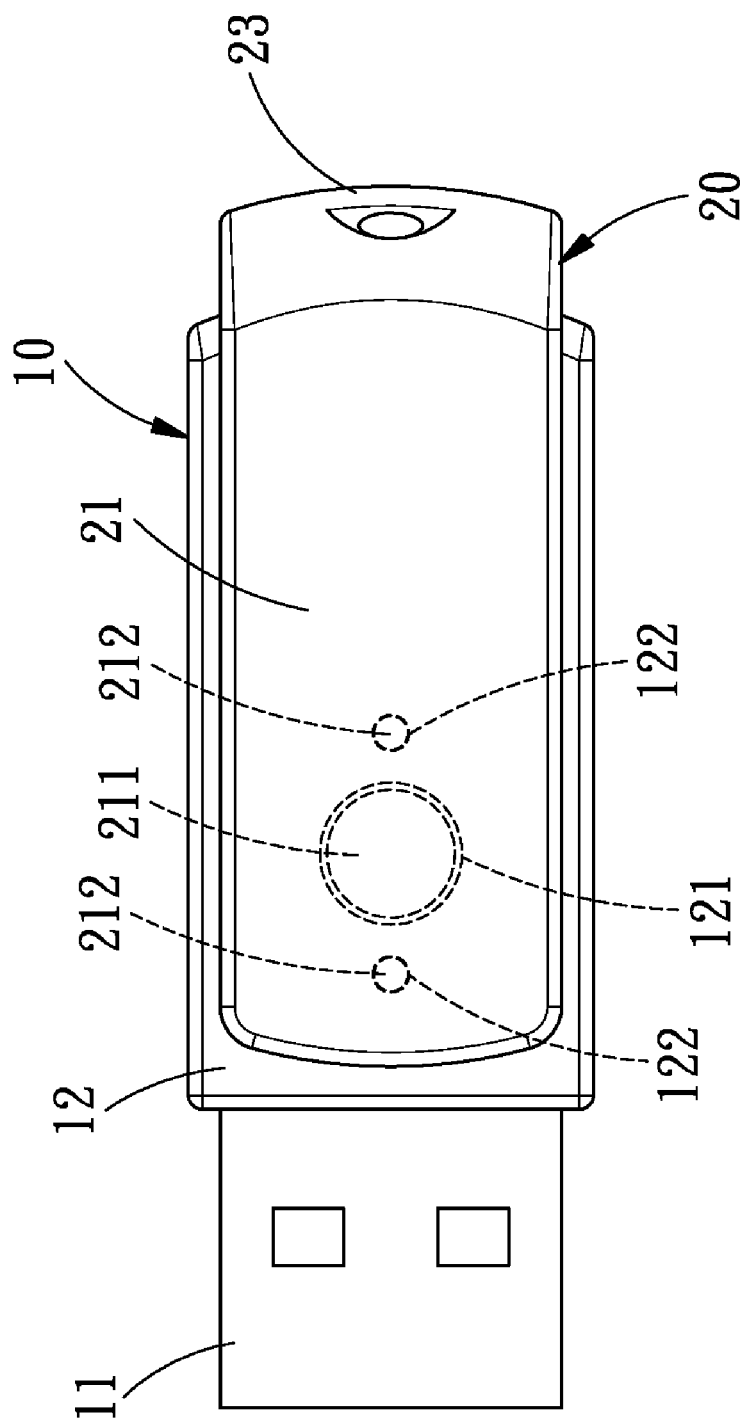
FIG. 4 is a top view showing a use state of the portable storage device in accordance with the first embodiment of the present invention.

Referring to FIGS. 3 and 4 showing the use state of the portable storage device in accordance with the present invention after the rotating and positioning of the protecting cap 20, when the protecting cap 20 is rotated continuously to make the covering portion 23 of the protecting cap 20 cover the rear end of the body 10, the positioning portions 212, 222 of the upper and the lower arms 21, 22 of the protecting cap 20 will be engaged into the positioning grooves 122, 132 of the upper and the lower surfaces 12, 13 of the body 10, so that the protecting cap 20 can be prevented from undesired rotation relative to the body 10. After use, the portable storage device of the present invention can be stored again by repeating the above steps in reverse order.

Hence, it is apparent from the above description that the present invention is convenient to use since the portable storage device of the present invention can be opened or closed easily by a pushing action.

Figure 8:
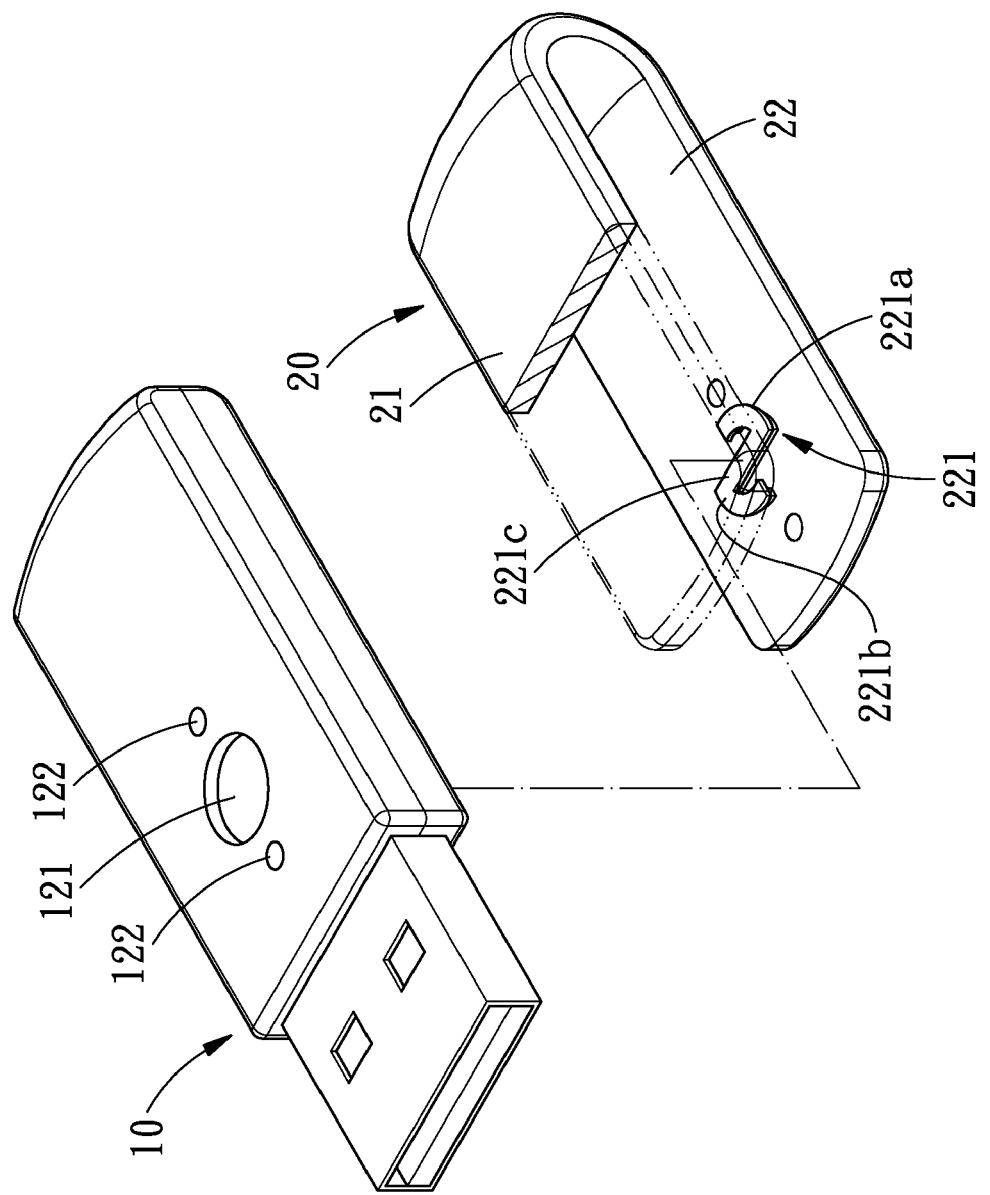
FIG. 8 is an exploded view of a portable storage device in accordance with a second embodiment of the present invention, showing the protruding portions of the protecting cap are S-shaped in cross section.

As shown in FIG. 8 showing that the protruding portions of the upper and the lower arm 21, 22 are S-shaped in cross section, since the protruding portion 211 of the upper arm 21 is symmetrical to the protruding portion 221 of the lower arm 22, only the description of the protruding portion 221 of the lower arm 22 is provided herein, the protruding portion 221 includes two arc surfaces 221a, 221b at an outer peripheral side thereof and a connecting segment 221c connected between the two arc segments 221a, 221b. After the protruding portion 221 in the present embodiment is assembled into the corresponding pivot hole of the body, the two arc surfaces 221a, 221b will be located opposite the inner surface of the pivot hole. The protruding portions which are S-shaped in cross section can prevent the overmuch contraction allowance of the material around the protruding portions during formation of the upper and the lower arms of the protecting cap, avoiding the surface irregularity of the upper and the lower arms.

Figure 9:
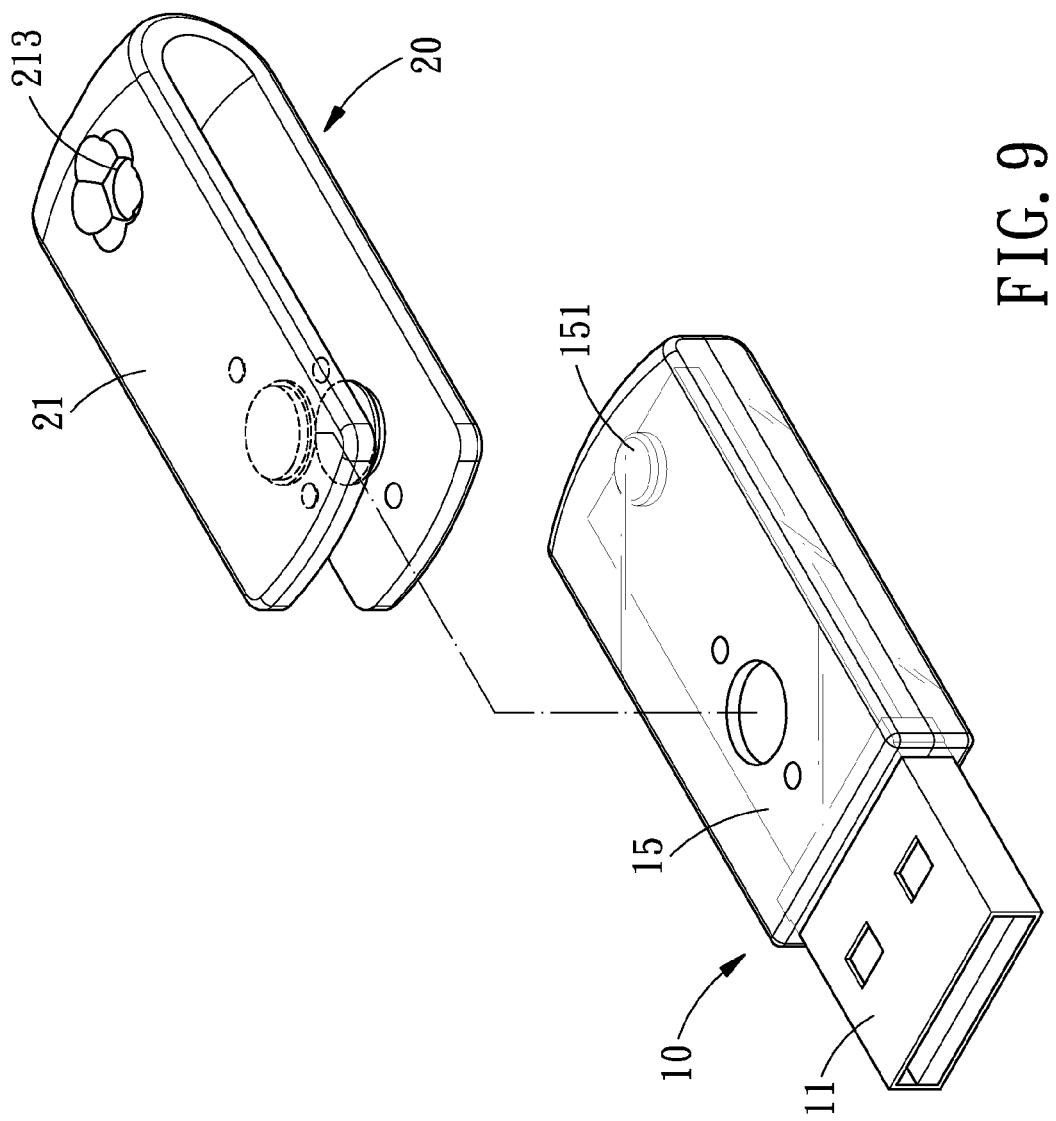
FIG. 9 is an exploded view of a portable storage device in accordance with a third embodiment of the present invention, showing that the indicator hole of the protecting cap is in alignment with the indicator light of the circuit board in the body.

Referring to FIG. 9, the body 10 is transparent and interiorly provided with a circuit board 15. The circuit board 15 includes an indicator light 151. The upper arm 21 of the protecting cap 20 is defined with an indicator hole 213 in alignment with the indicator light 151. When the plug 11 is inserted into a socket of a computer (not shown) and electrified, the indicator light 151 will emit light through the indicator hole 213 of the upper arm 21 to indicate whether the portable storage device is connected and show the state of the data accessing operation.

While we have shown and described various embodiments in accordance with the present invention, it is clear to those skilled in the art that further embodiments may be made without departing from the scope of the present invention.

What is claimed is:

1. A portable storage device comprising:
    a body including a plug at a front end thereof, an upper surface, a lower surface and two side surfaces connected between the upper and the lower surfaces, the upper surface and the lower surface each including a pivot hole, and two positioning grooves around the pivot hole; and
    a protecting cap including two arms, and a covering portion connected to one end of the respective arms, the two arms each being provided on an inner side surface thereof with a protruding portion and two positioning portions around the protruding portion, the two arms being located on the upper and the lower surfaces of the body respectively, and the protruding portions of the two arms being pivoted into the pivot holes of the upper surface and the lower surface respectively, the two positioning portions being capable of engaging with and disengaging from the two positioning grooves, when the positioning portions are engaged into the positioning grooves, the covering portion will cover the plug at the front end of the body or a rear end of the body, when the positioning portions are disengaged from the positioning grooves, the covering portion will not cover the plug any more;
    the body is transparent and interiorly provided with a circuit board, the circuit board includes an indicator light, one of the two arms of the protecting cap is defined with an indicator hole in alignment with the indicator light;
    the protruding portions of the two arms of the protecting cap each includes two arc surfaces at an outer peripheral side thereof and a connecting segment connected between the two arc surfaces, after the protruding portions are pivoted into the respective pivot holes of the body, the two arc surfaces of the respective protruding portions will be located opposite an inner surface of the respective pivot holes.

* * * * *